(12) United States Patent
Fischer et al.

(10) Patent No.: US 7,802,983 B2
(45) Date of Patent: Sep. 28, 2010

(54) CONFIGURABLE MANIFOLD

(75) Inventors: Jonathon Fischer, Oakville (CA);
Rhonda Goslinski, Guelph (CA)

(73) Assignee: Mold-Masters (2007) Limited,
Georgetown (CA)

( * ) Notice: Subject to any disclaimer, the term of this patent is extended or adjusted under 35 U.S.C. 154(b) by 0 days.

(21) Appl. No.: 12/326,478

(22) Filed: Dec. 2, 2008

(65) Prior Publication Data

US 2009/0117219 A1 May 7, 2009

Related U.S. Application Data

(62) Division of application No. 11/399,940, filed on Apr. 7, 2006, now Pat. No. 7,465,165.

(60) Provisional application No. 60/668,999, filed on Apr. 7, 2005.

(51) Int. Cl.
*B29C 45/22* (2006.01)
*B29C 45/74* (2006.01)

(52) U.S. Cl. ...................... 425/570; 425/572

(58) Field of Classification Search ................ 425/570, 425/572
See application file for complete search history.

(56) References Cited

U.S. PATENT DOCUMENTS

| | | | |
|---|---|---|---|
| 3,095,604 A | 7/1963 | Ackaret | |
| 3,231,938 A | 2/1966 | Seymour | |
| 3,399,428 A | 9/1968 | Valyi | |
| 3,553,788 A | 1/1971 | Putkowski | |
| 3,849,048 A | 11/1974 | Bielfeldt et al. | |
| 3,940,224 A | 2/1976 | Armour | |
| 4,043,726 A | 8/1977 | Tsunemoto et al. | |
| 4,082,324 A | 4/1978 | Obrecht | |
| 4,219,323 A | 8/1980 | Bright et al. | |
| 4,292,018 A | 9/1981 | Beale | |
| 4,333,629 A | 6/1982 | Roy | |
| 3,677,682 A | 7/1982 | Putkowski | |
| 4,340,156 A | 7/1982 | Muller | |
| 4,422,841 A | 12/1983 | Alfonsi et al. | |
| 4,497,624 A | 2/1985 | Brun et al. | |

(Continued)

FOREIGN PATENT DOCUMENTS

DE         43 24 027 A1     1/1995

(Continued)

OTHER PUBLICATIONS

EP Search Report, EP Application No. 06 00 7451, Jul. 25, 2006.

(Continued)

*Primary Examiner*—Tim Heitbrink
(74) *Attorney, Agent, or Firm*—Medler Ferro PLLC

(57) ABSTRACT

An injection molding apparatus includes a manifold having a melt channel for receiving a melt stream of moldable material from a source. A nozzle having a nozzle channel is coupled to the manifold for receiving the melt stream from the manifold melt channel. The nozzle includes a heater. A mold cavity is in communication with the nozzle channel, the mold cavity for receiving the melt stream from the nozzle channel through a mold gate. A temperature sensor is disposed at the manifold for use in adjusting the heater of the nozzle or for use in adjusting a heater of an inlet body.

13 Claims, 16 Drawing Sheets

U.S. PATENT DOCUMENTS

| | | | |
|---|---|---|---|
| 4,514,160 A | 4/1985 | Davidsmeyer |
| 4,707,310 A | 11/1987 | Debeaud |
| 4,726,751 A | 2/1988 | Shibata et al. |
| 4,761,343 A | 8/1988 | Gellert |
| 4,899,288 A | 2/1990 | Tsutsumi |
| 4,945,630 A | 8/1990 | Gellert |
| 4,964,795 A | 10/1990 | Tooman |
| 5,030,084 A | 7/1991 | Gellert et al. |
| 5,135,688 A | 8/1992 | Nakamura et al. |
| 5,147,663 A | 9/1992 | Trakas |
| 5,220,154 A | 6/1993 | Gunther |
| 5,227,179 A | 7/1993 | Benenati |
| 5,411,686 A | 5/1995 | Hata |
| 5,419,858 A | 5/1995 | Hata et al. |
| 5,518,389 A | 5/1996 | Nonomura et al. |
| 5,536,164 A | 7/1996 | Brun, Jr. et al. |
| 5,707,664 A | 1/1998 | Mak |
| 5,720,995 A | 2/1998 | Gellert |
| 5,738,149 A | 4/1998 | Brun, Jr. et al. |
| 5,772,933 A | 6/1998 | Kotzab |
| 5,792,493 A | 8/1998 | Gellert |
| 5,804,231 A | 9/1998 | Prophet et al. |
| 5,817,988 A | 10/1998 | Suzuki |
| 5,894,025 A | 4/1999 | Lee et al. |
| 6,062,840 A | 5/2000 | Lee et al. |
| 6,095,790 A | 8/2000 | Gellert et al. |
| 6,107,610 A | 8/2000 | Tarr |
| 6,254,377 B1 | 7/2001 | Kazmer et al. |
| 6,261,075 B1 | 7/2001 | Lee et al. |
| 6,287,107 B1 | 9/2001 | Kazmer et al. |
| 6,294,122 B1 | 9/2001 | Moss et al. |
| 6,309,208 B1 | 10/2001 | Kazmer et al. |
| 6,343,921 B1 | 2/2002 | Kazmer et al. |
| 6,343,922 B1 | 2/2002 | Kazmer et al. |
| 6,361,300 B1 | 3/2002 | Kazmer et al. |
| 6,419,870 B1 | 7/2002 | Lee et al. |
| 6,422,856 B1 | 7/2002 | Mochizuki |
| 6,436,320 B1 | 8/2002 | Kazmer et al. |
| 6,447,283 B1 | 9/2002 | Gellert |
| 6,464,909 B1 | 10/2002 | Kazmer et al. |
| 6,514,440 B1 | 2/2003 | Kazmer et al. |
| 6,533,021 B1 | 3/2003 | Shibata et al. |
| 6,585,505 B2 | 7/2003 | Kazmer et al. |
| 6,589,039 B1 | 7/2003 | Doughty et al. |
| 6,599,116 B2 | 7/2003 | Lee et al. |
| 6,632,079 B1 | 10/2003 | Kazmer et al. |
| 6,638,049 B1 | 10/2003 | Moss et al. |
| 6,649,095 B2 | 11/2003 | Buja |
| 6,713,002 B2 | 3/2004 | Kazmer et al. |
| 6,752,618 B2 | 6/2004 | Dewar et al. |
| 6,767,486 B2 | 7/2004 | Doughty et al. |
| 6,769,896 B2 | 8/2004 | Kazmer et al. |
| 6,824,379 B2 | 11/2004 | Doyle et al. |
| 6,851,946 B1 | 2/2005 | Plass et al. |
| 6,902,119 B2 | 6/2005 | Chen et al. |
| RE38,920 E | 12/2005 | Gellert |
| 7,020,540 B2 | 3/2006 | Linehan et al. |
| 7,029,268 B2 | 4/2006 | Doyle et al. |
| 7,179,081 B2 | 2/2007 | Sicilia et al. |
| 7,196,295 B2 | 3/2007 | Fennewald et al. |
| 7,234,929 B2 | 6/2007 | Vasapoli et al. |
| 7,270,537 B2 | 9/2007 | Doyle et al. |
| 7,465,165 B2 * | 12/2008 | Fischer et al. ............... 425/570 |
| 2002/0086086 A1 | 7/2002 | Doyle et al. |
| 2002/0121713 A1 | 9/2002 | Moss et al. |
| 2002/0190413 A1 | 12/2002 | Kazmer et al. |
| 2003/0155672 A1 | 8/2003 | Kazmer et al. |
| 2004/0047935 A1 | 3/2004 | Moss et al. |
| 2004/0258793 A1 | 12/2004 | Sicilia et al. |
| 2006/0202372 A1 | 9/2006 | Girelli et al. |
| 2006/0228442 A1 | 10/2006 | Fischer et al. |
| 2007/0224303 A1 | 9/2007 | Vasapoli et al. |
| 2007/0273060 A1 | 11/2007 | Doyle et al. |
| 2008/0085334 A1 | 4/2008 | Barnett |
| 2008/0290542 A1 | 11/2008 | Olaru |

FOREIGN PATENT DOCUMENTS

| | | |
|---|---|---|
| DE | 44 25 981 A1 | 1/1996 |
| DE | 29909535 U | 8/1999 |
| DE | 200 14 043 U1 | 1/2001 |
| DE | 101 50 419 A1 | 5/2003 |
| EP | 0 162 412 | 11/1985 |
| EP | 0 630 733 B1 | 12/1994 |
| EP | 1 316 403 A | 6/2003 |
| FR | 2829058 B1 | 3/2003 |
| FR | 2 877 870 A1 | 5/2006 |
| GB | 1535164 | 12/1978 |
| JP | 58-051126 A | 3/1983 |
| JP | 60-143922 | 7/1985 |
| JP | 4-008522 | 1/1992 |
| JP | 4-30916 | 3/1992 |
| JP | 2002127220 A | 5/2002 |
| JP | 2002-205320 A | 7/2002 |
| JP | 2003-159726 A | 6/2003 |
| JP | 2006007658 | 1/2006 |
| NL | 1025041 | 2/2005 |
| TW | 556659 | 10/2003 |
| WO | WO-9857244 A1 | 12/1998 |

OTHER PUBLICATIONS

"Ewikon Brochure—ecomodul", Nov. 1, 2005.
"Modular System", *Contherm s.r.l. Brochure* Mar. 26, 1986.
"Modular System", *Contherm s.r.l. Brochure* May 1988.
"Quality Management for Plastics Processing", *Priamus Systems Technologies* Date Unknown.
"Runnerless Molding Systems", RAMA unknown.
"System Description, Priamus Fill Type 7001A", *Priamus System Technologies Date Unknown*.
Rubin, Irvin I., "It's Time to Reconsider Hot-Runner Systems—Part 1", *Plastics Engineering* vol. 26, No. 2 Feb. 1980, 16-21.
"Ewikon Brochure—ecomodul", Nov. 2004.
Extended European Search Report, EP App No. 09000533.1, Jul. 7 2009.
Office Action dated Nov. 12, 2009 in U.S. Appl. No. 12/126,378.
Amendment and Reply filed Feb. 12, 2010 in U.S. Appl. No. 12/126,378.
Final Office Action dated Apr. 26, 2010 in U.S. Appl. No. 12/126,378.

* cited by examiner

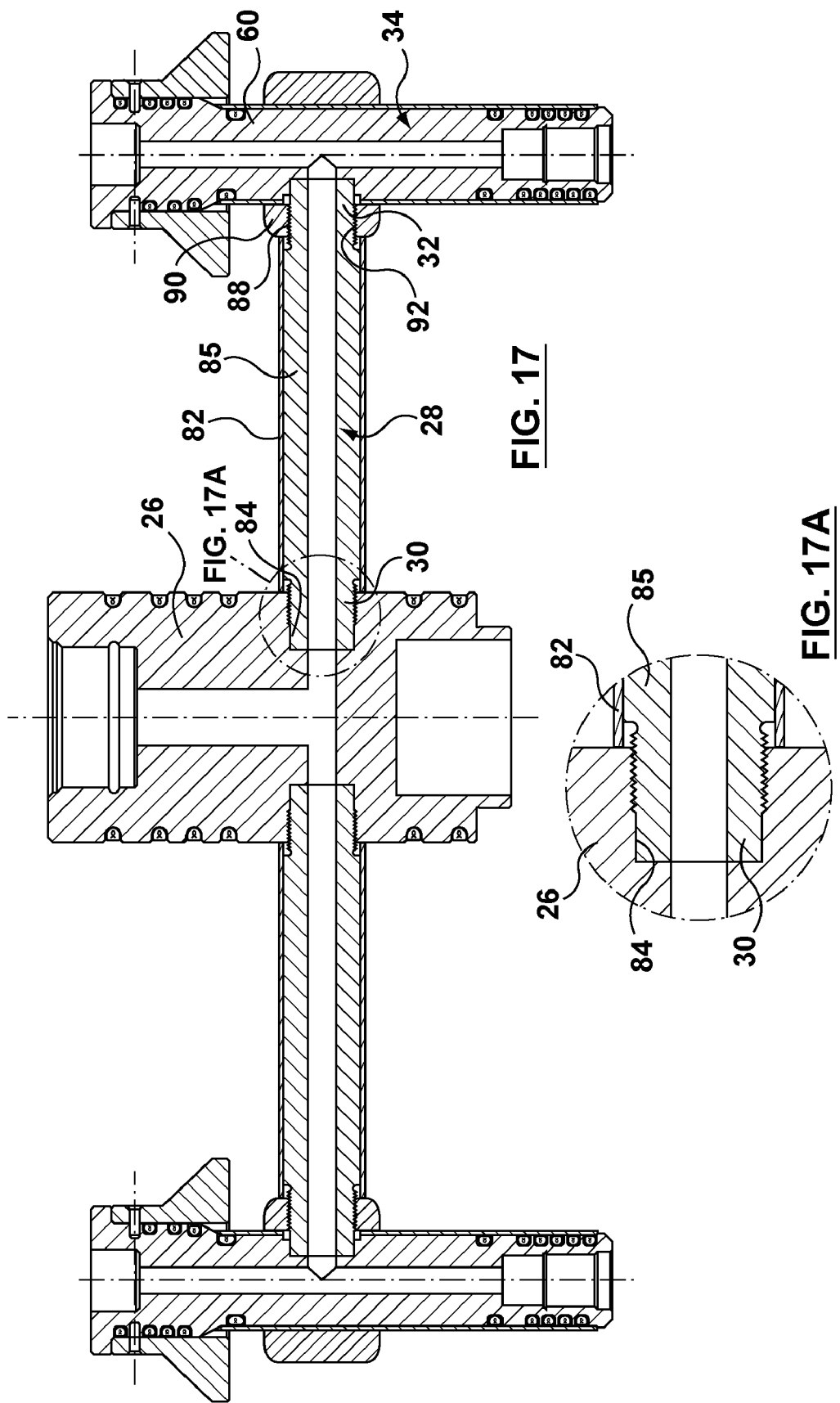

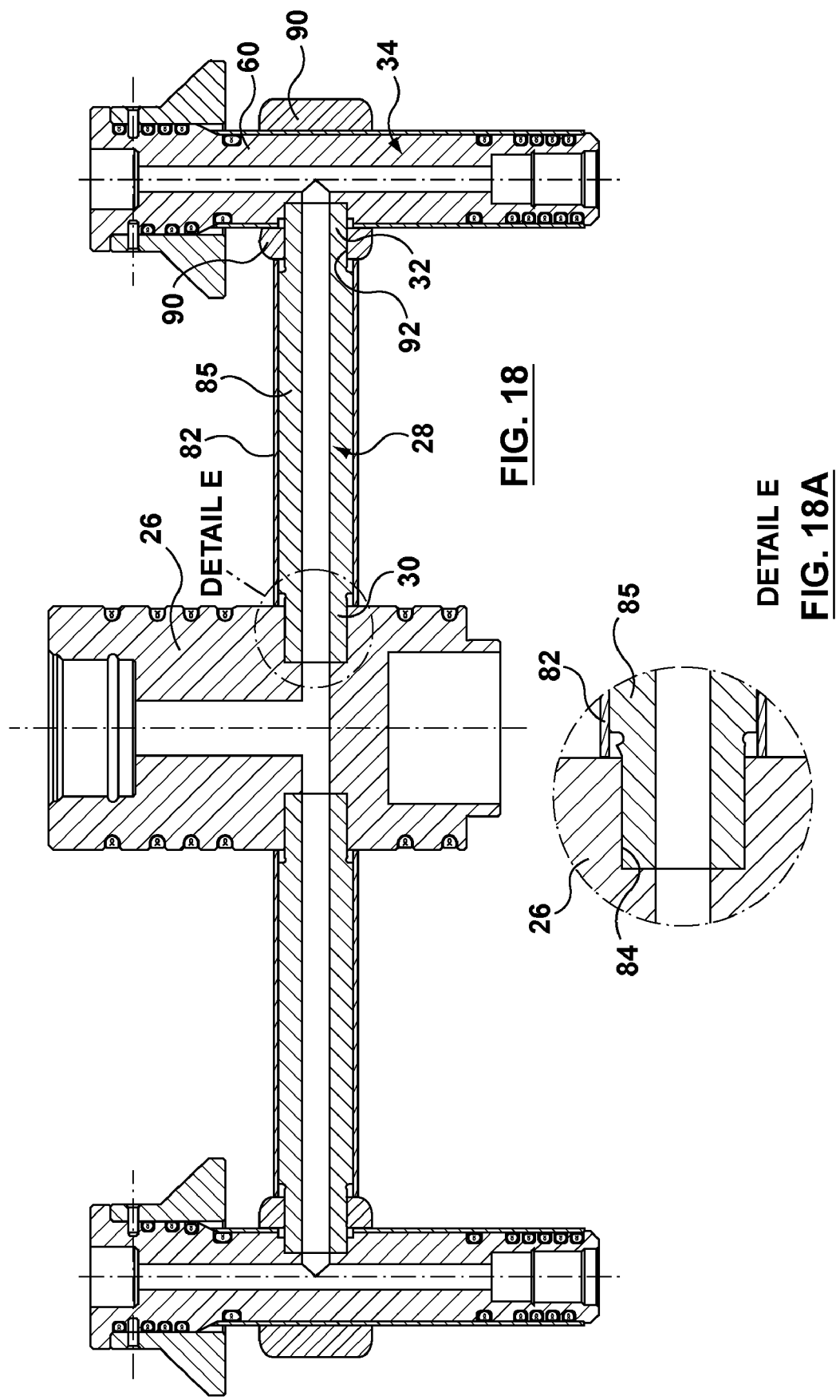

CONFIGURABLE MANIFOLD

CROSS-REFERENCE TO RELATED APPLICATIONS

This application is a divisional of U.S. application Ser. No. 11/399,940 filed Apr. 7, 2006, now U.S. Pat. No. 7,465,165 which claims the benefit under 35 U.S.C. §119(e) of U.S. Appl. No. 60/668,999 filed Apr. 7, 2005, both of which are incorporated by reference herein in their entirety.

FIELD OF THE INVENTION

The present invention relates generally to an injection molding apparatus and, in particular to a configurable manifold for an injection molding apparatus.

BACKGROUND OF THE INVENTION

In a typical injection molding apparatus, a manifold delivers melt to a mold cavity through a hot runner nozzle. A manifold may include one, two or a plurality of outlets for delivering melt to respective hot runner nozzles. The shape, size and number of mold cavities typically determine the configuration of the manifold and hot runner nozzles for a particular injection molding application. For each different application, the manifold is typically custom made, which is a costly and time-consuming process.

It is therefore desirable to provide a configurable manifold that can be quickly and easily assembled and customized for an injection molding application.

SUMMARY OF THE INVENTION

According to an embodiment of the present invention there is provided an injection molding hot runner apparatus with a manifold. The manifold includes a melt channel for delivering melt from a source to a nozzle in a hot runner system. The melt flows through a nozzle channel in the nozzle to a mold cavity though a mold gate. The manifold may include an inlet body. The inlet body and the nozzle may each include a heater. A temperature sensor is disposed at the manifold for use in adjusting the heater of the nozzle and/or the heater of the inlet body.

BRIEF DESCRIPTION OF THE FIGURES

Embodiments of the present invention will now be described more fully with reference to the accompanying drawings in which like reference numerals indicate similar structure.

FIG. 17 is a side sectional view of an inlet body, distribution branch, and nozzle assembly according to an embodiment of the invention. FIG. 17A is a detail view of a first end of the distribution branch coupled to the inlet body.

FIG. 18 is a side sectional view of an inlet body, distribution branch, and nozzle assembly according to an embodiment of the invention. FIG. 18A is a detail view of a first end of the distribution branch coupled to the inlet body.

DETAILED DESCRIPTION OF THE INVENTION

Figure 1:
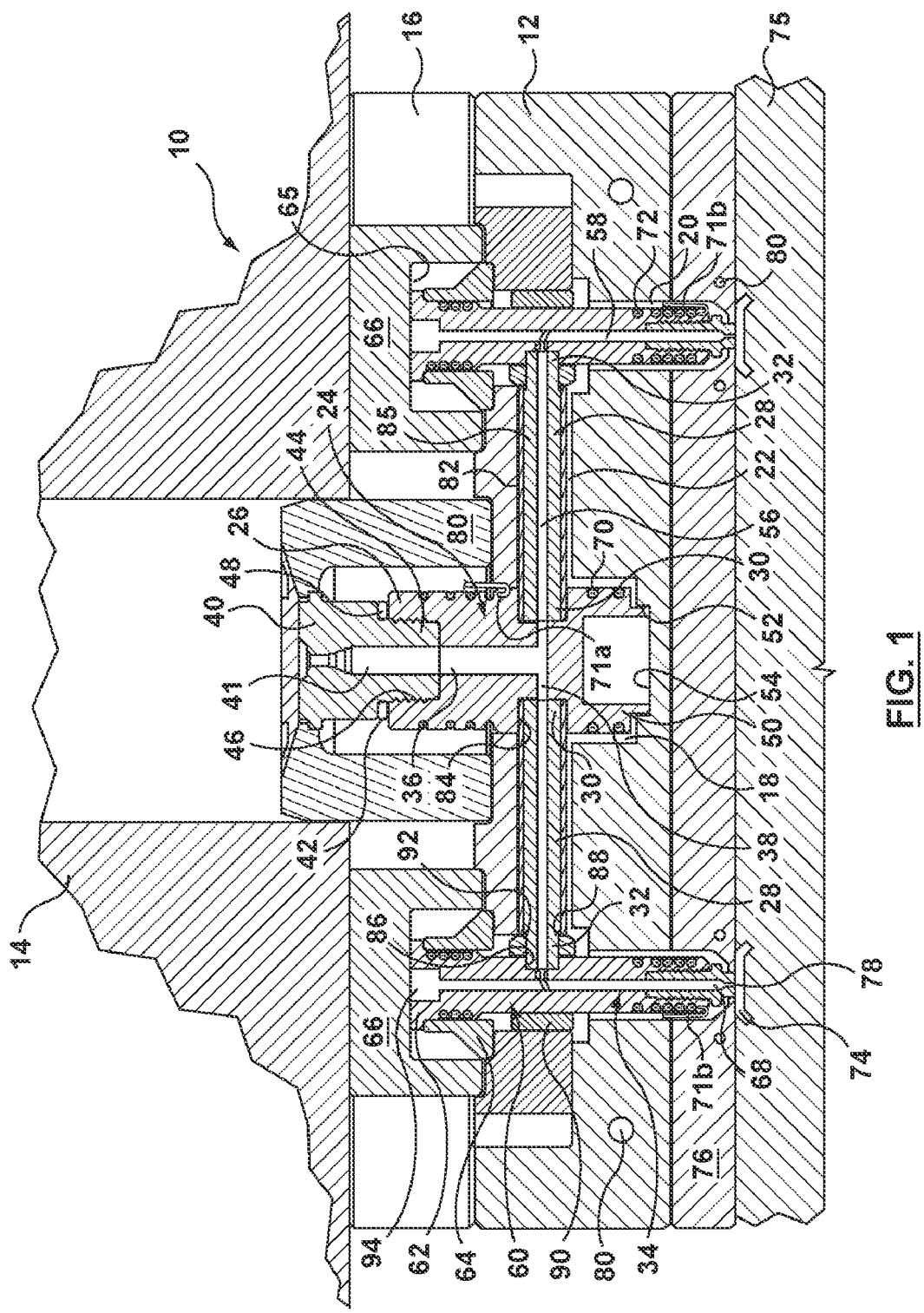
FIG. 1 is a side sectional view of an injection molding apparatus according to an embodiment of the present invention.

Referring now to FIG. 1, an injection molding apparatus 10 is generally shown. Injection molding apparatus 10 includes a manifold plate 12 that is spaced from a machine platen 14 by pillars 16. Manifold plate 12 includes a central bore 18 and a pair of nozzle receiving bores 20, which are spaced from central bore 18 and located on opposite sides thereof. As shown, the central bore 18 extends part way into the manifold plate 12 and nozzle-receiving bores 20 extend through the manifold plate 12. Troughs 22 extend between the central bore 18 and each of the nozzle receiving bores 20.

A manifold 24 includes an inlet body 26, which is partially received in central bore 18 of manifold plate 12, and a pair of distribution branches 28, which extend outwardly from the inlet body 26. The distribution branches 28 are received in troughs 22 of the manifold plate 12. Nozzle assemblies 34 are coupled to the distribution branches 28 and are received in the nozzle-receiving bores 20.

The inlet body 26 includes an inlet channel 36 and a pair of outlet channels 38. A forward end 50 of the inlet body 26 includes a flange 52 that is received in a recess 54 of manifold plate 12. The flange 52 functions to locate the inlet body 26 with respect to the manifold plate 12. Inlet body 26 is heated by a heater 70 and further includes a thermocouple 71a.

A sprue bushing 40 having a melt channel 41 is coupled to a rear end 42 of inlet body 26. The sprue bushing 40 includes a threaded projection 44 that is received in a threaded recess 46 of the inlet body 26. A washer 48 is provided between the sprue bushing 40 and the rear end 42 of the inlet body 26. A locating ring 80 surrounds the inlet body 26 and locates the sprue bushing 40 relative to the machine platen 14.

Each distribution branch 28 includes a first end 30, which is coupled to the inlet body 26, and a second end 32, which is coupled to the nozzle assembly 34. Each distribution branch 28 is generally a tube 85 that is surrounded by a conductive sleeve 82. The conductive sleeve 82 may be copper, aluminum, brass, bronze or any other suitable material that is more conductive than the tube 85 material. The tube 85 is generally made from a type of steel such as H13 or P20. Alternatively, the tube 85 may be made of any other suitable material which can handle the heat and pressure of the melt during the injection molding processes typically up to approximately 350 degrees ° C. and 50,000 psi. The distribution branch 28 does not include a heater. Instead, heat is transferred to the distribution branch 28 through the conductive sleeve 82 from the inlet body 26 and the nozzle assembly 34. A different conductive device could be substituted for conductive sleeve 82. For example, a conductive coating or film could be applied to tube 85 to transfer heat from inlet body 26 and nozzle assembly 34 to the melt flowing in tube 85.

First end 30 of distribution branch 28 is slidably received in a bore 84 that is provided in inlet body 26. The bore 84 is sized based on the ranges of operating temperatures in order to accommodate axial thermal expansion of the distribution branch 28 within that operating temperature range. If the bore is too deep, a dead spot may occur between the distribution branch 28 and the inlet body 26, which may trap plastic that will degrade overtime. This degraded material may then be drawn out from the dead spot during subsequent injection cycles and enter the melt stream and consequentially end up in the molded part. Conversely, if the bore is too shallow, a force may be exerted on the inlet body 26 and the nozzle assembly 34 by the distribution branch 28, which can result in misalignment within the apparatus 10.

Second end 32 is not surrounded by conductive sleeve 82 and is received in a bore 86 that is provided in the nozzle assembly 34. A clamp 90 surrounds the nozzle assembly 34 and includes a threaded bore 92 A threaded portion 88 of the second end 32 mates with the threaded bore 92 of the clamp 90 to fix the second end 32 of the distribution branch 28 to the nozzle assembly 34. Because the second end 32 is fixed, axial thermal expansion occurs in the direction of the inlet body 26. As such, the alignment of the nozzle assembly 34 with respect to mold cavity 74 is unaffected by the thermal expansion. In addition, radial thermal expansion occurs at the first end 30 due to the conductive sleeve 82, which provides a seal between the distribution branch 28 and the inlet body 26. It will be appreciated by a person skilled in the art that the first end 30 of distribution branch 28 may be fixed by any known means to the inlet body 26 while the second end 32 of the distribution branch 28 may be slidably received in bore 86 of the nozzle assembly 34, or that both ends of the distribution branch 28 may be fixed (as shown in FIGS. 17 and 17A) or sliding (as shown in FIGS. 18 and 18A).

Each nozzle assembly 34 includes a nozzle body 60 having a nozzle head 62. A collar 64 surrounds the nozzle body 60 to align the nozzle body 60 relative to the manifold plate 12. The collar 64 is sandwiched between the manifold plate 12 and an abutment surface 65 of a support 66. The collar 64 maintains nozzle head 62 in abutment with the support 66, which is clamped between machine platen 14 and manifold plate 12. Fasteners (not shown) fix the support 66 to the manifold plate 12. A nozzle tip 68 is received in a downstream end of the nozzle body 60 and is threaded thereto. Nozzle channel 58 extends through nozzle body 60 and nozzle tip 68. A plug 94 is received in an upstream end of the nozzle body 60 to seal off a portion of the pre-drilled channel 58. Nozzle assembly 34 is heated by a heater 72 and further includes a thermocouple 71*b*.

Mold cavity 74 is provided between a cavity plate 76 and a mold core 75. The mold cavity 74 receives melt from nozzle channel 58 through a mold gate 78. Cooling channels 80 extend through manifold plate 12 and the cavity plate 76 to cool mold cavity 74.

The injection molding apparatus 10 does not include a clamp plate, which is also referred to as a back plate. The clamp plate has been replaced by pillars 16, which space the machine platen 14 from the manifold plate 12. The pillars 16 are located to evenly distribute a clamping force that occurs between the machine platen 14 and the manifold plate 12. This arrangement allows for less material to be used in the apparatus 10, which generally results in lower overall cost.

In operation, melt is injected from a machine nozzle (not shown) into inlet channel 36 of inlet body 26 through melt channel 41 of sprue bushing 40. The melt then flows through outlet channels 38 of inlet body 26 into melt channels 56 of distribution branches 28. From the distribution branches 28, the melt flows into nozzle channels 58 of nozzle assemblies 34, through mold gates 78 and into mold cavities 74. During operation, the conductive sleeve 82 transfers heat from the heated inlet body 26 and the heated nozzle assembly 34 to the melt passing through the distribution branch 28 in order to maintain the melt at a desired temperature as it passes between the inlet body 26 to the nozzle assembly 34. Once the mold cavities 74 have been filled with melt, the temperature in the nozzle assembly 34 is lowered to freeze off the plastic at the nozzle tip 68, the melt in the mold cavities 74 is cooled and the molded parts are ejected from injection molding apparatus 10.

Figure 2:
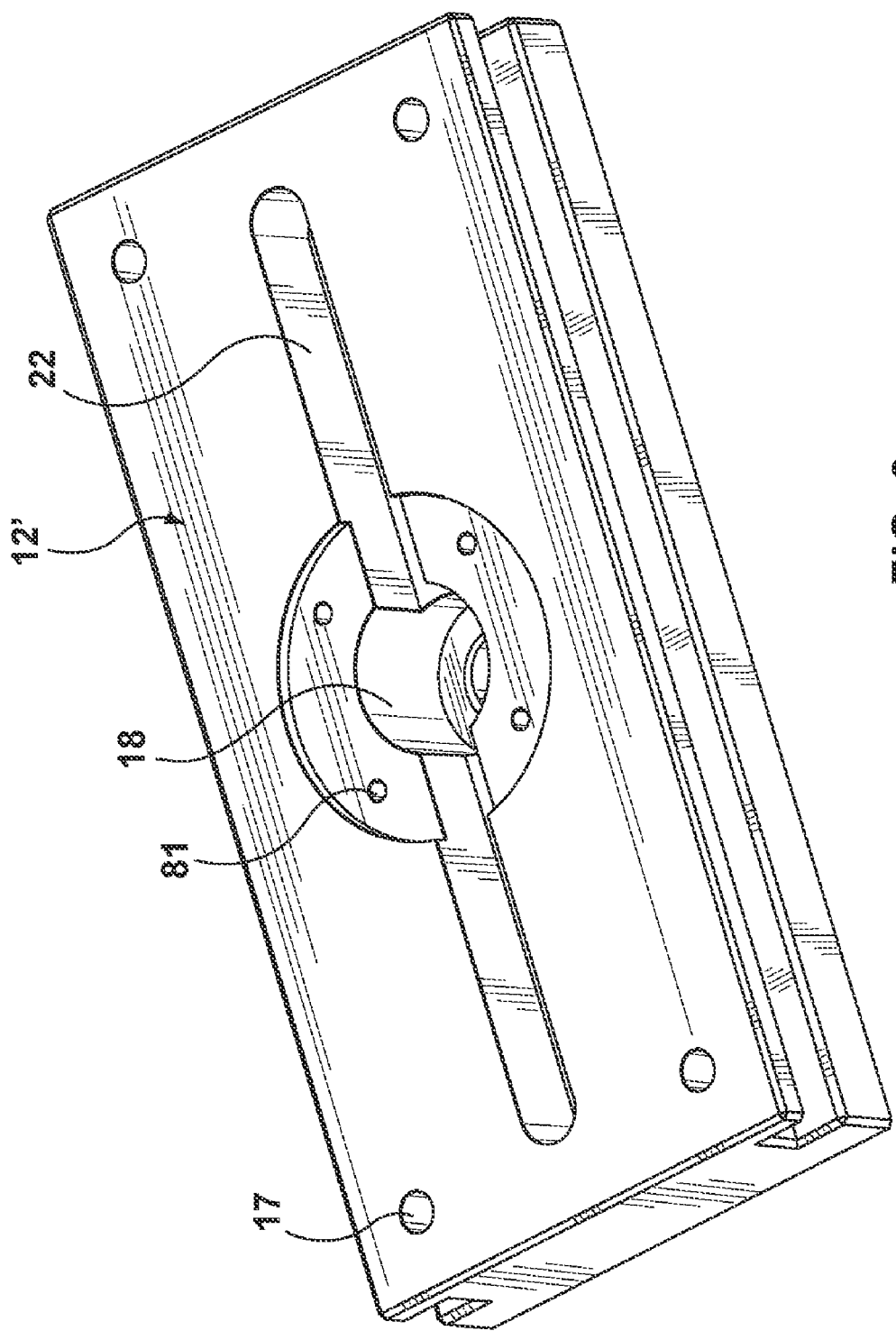
FIG. 2 is an isometric view of a manifold plate of FIG. 1, prior to customization and assembly.

Referring to FIG. 2, a manifold plate 12' is shown prior to final machining and assembly in the injection molding apparatus 10. The manifold plate 12' includes central bore 18 and troughs 22, which are machined therein. Fastener-receiving bores 17 for locating the pillars 16 relative to the manifold plate 12 and fastener-receiving bores 81 for the locating ring 80 are also machined. The partially machined manifold plate 12' may subsequently be configured for use with various mold cavity dimensions by drilling nozzle receiving bores 20 at desired locations along the troughs 22.

In order to configure the manifold plate 12' and provide a customized manifold 24, the distance between the nozzle assembly 34 and the inlet body 26 is first determined based on the layout of the mold cavities 74. Once this distance is known, the distribution branches 28 are cut to an appropriate length from either a partially finished stock size or a long tube stock. Partially finished stock sizes tubes have been cut to a length close to the final lengths generally required for distribution branches 28. One end has been finished, for example threaded, while the other end is left unfinished to be trimmed to the final required length. The distribution branches 28 may alternatively be cut from long tube stock to the desired final length and then finished. The conductive sleeves 82 are then cut to length and installed onto the distribution branches 28. Conductive sleeves may be may be installed by shrink fit, hyrdroforming, brazing, snap-fit as shown in FIG. 15A, using a threaded cap as shown in FIG. 15B, or any other method known in the art. Nozzle-receiving bores 20 are drilled at proper locations along the troughs 22. The inlet body 26, distribution branches 28 and nozzle assemblies 34 are then assembled to form the manifold 24, which is dropped into the manifold plate 12. By maintaining partially machined manifold plates 12', standard length distribution branches 28, and standard nozzle assemblies 34 in stock, the length of time between receiving a custom order for a manifold for an injection molding apparatus and delivering the manifold is minimized.

Figure 3:
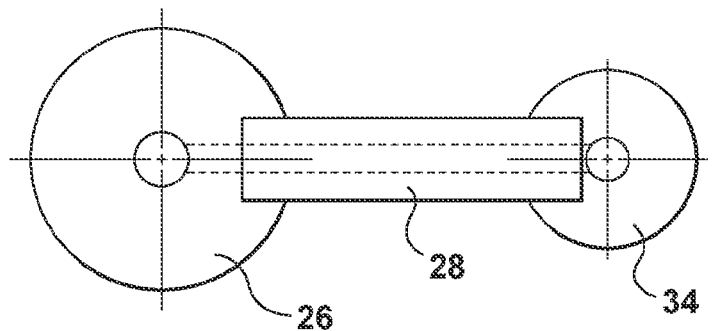
FIGS. 3 to 10 are schematic top views of various manifold configurations.
Figure 4:
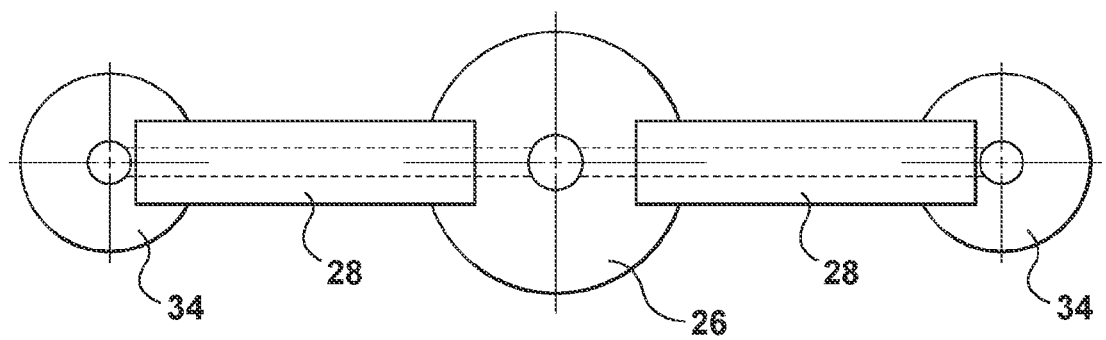
Figure 5:
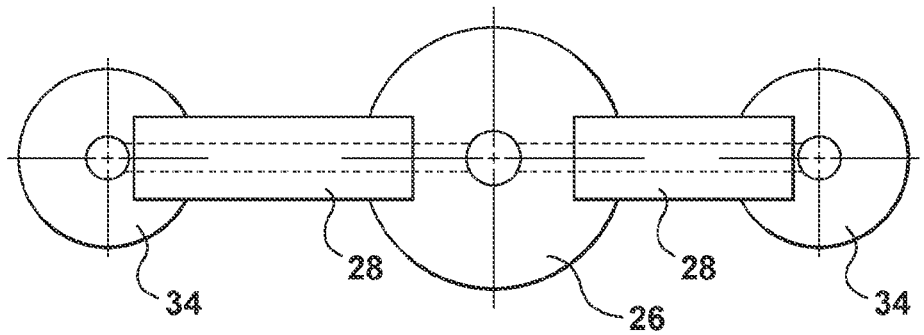
Figure 6:
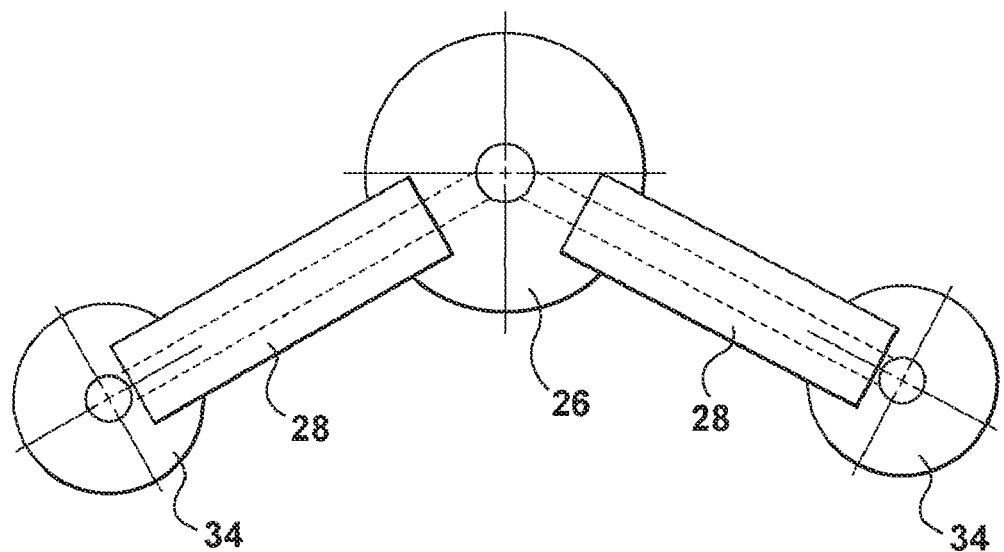
Figure 7:
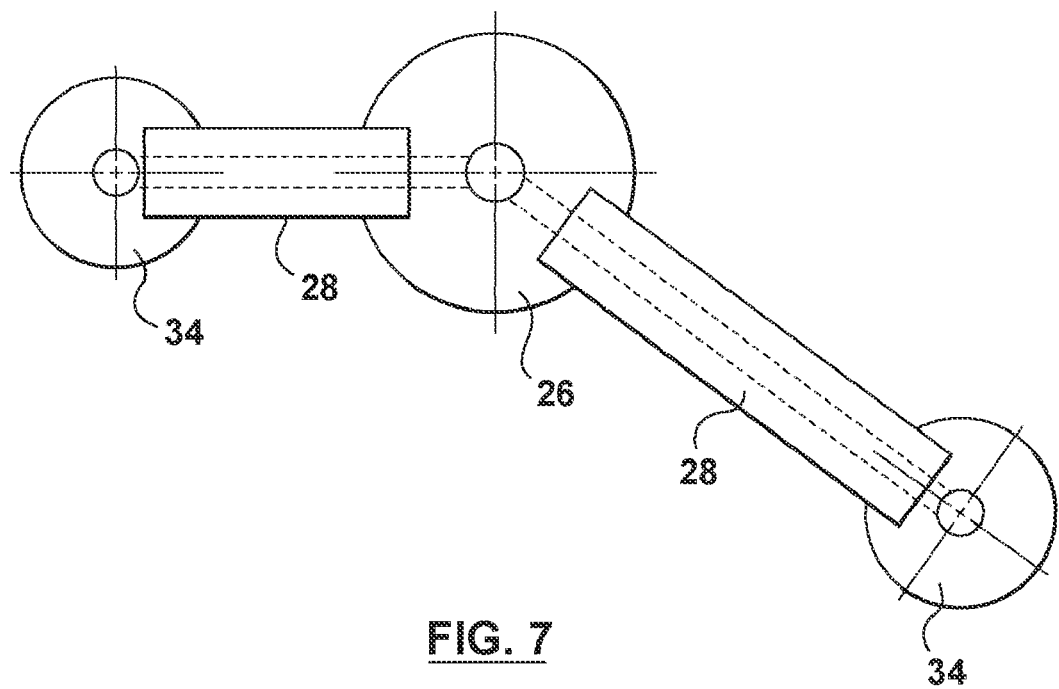
Figure 8:
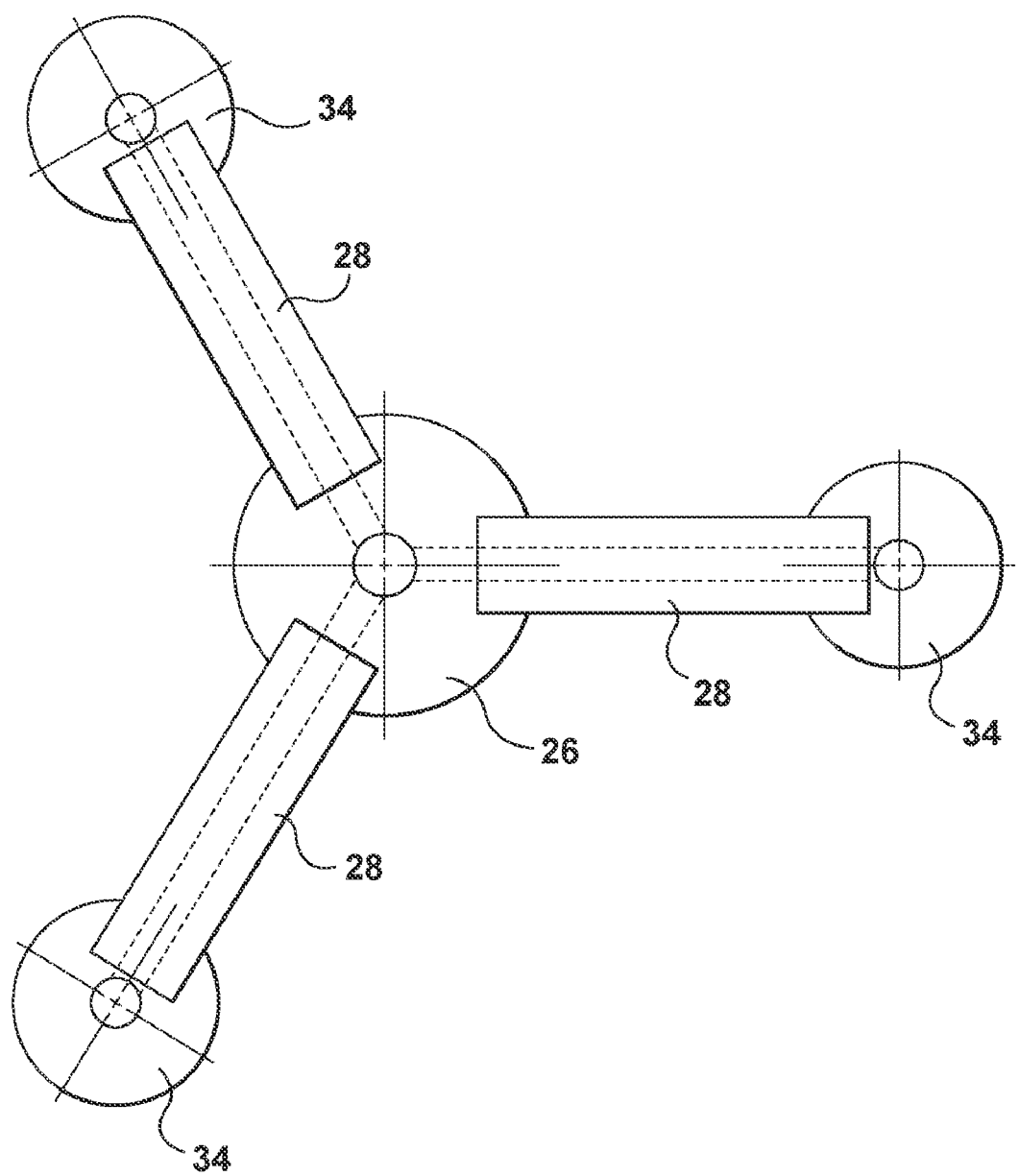
Figure 9:
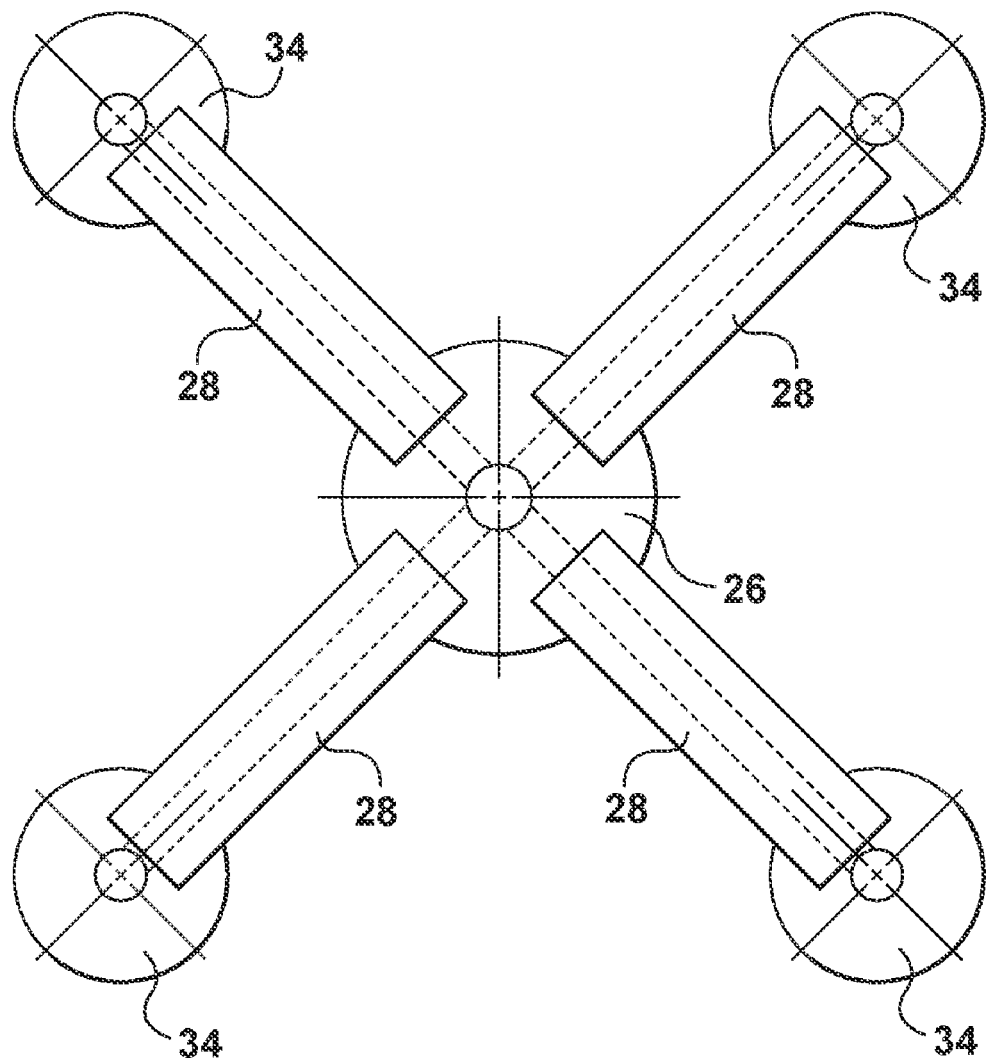

Manifold plate 12' may be configured to provide a single drop apparatus, which includes one nozzle assembly delivering melt to one mold cavity, as shown in FIG. 3, or a two-drop apparatus, such as the apparatuses shown in FIGS. 4 and 5. Stock manifold plates having alternate layouts may also be provided and may be configured to provide the two, three and four drop apparatuses shown in FIGS. 6 to 9. FIGS. 5 and 7 show examples of injection molding apparatuses in which the distribution branches 28 have been cut to various lengths to locate the nozzle assemblies 34 at different distances from the inlet body 26 to provide customized hot runner molds.

Figure 10:
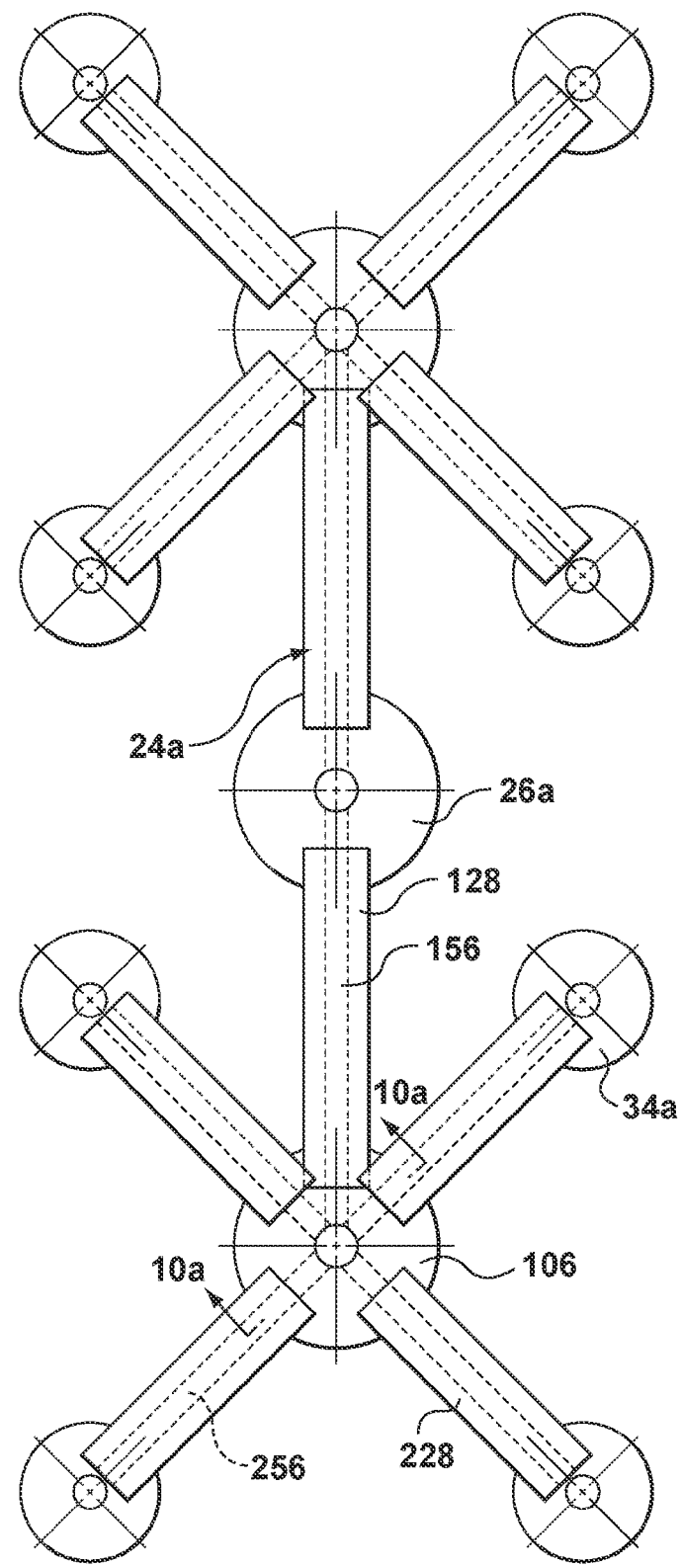
Figure 10A:
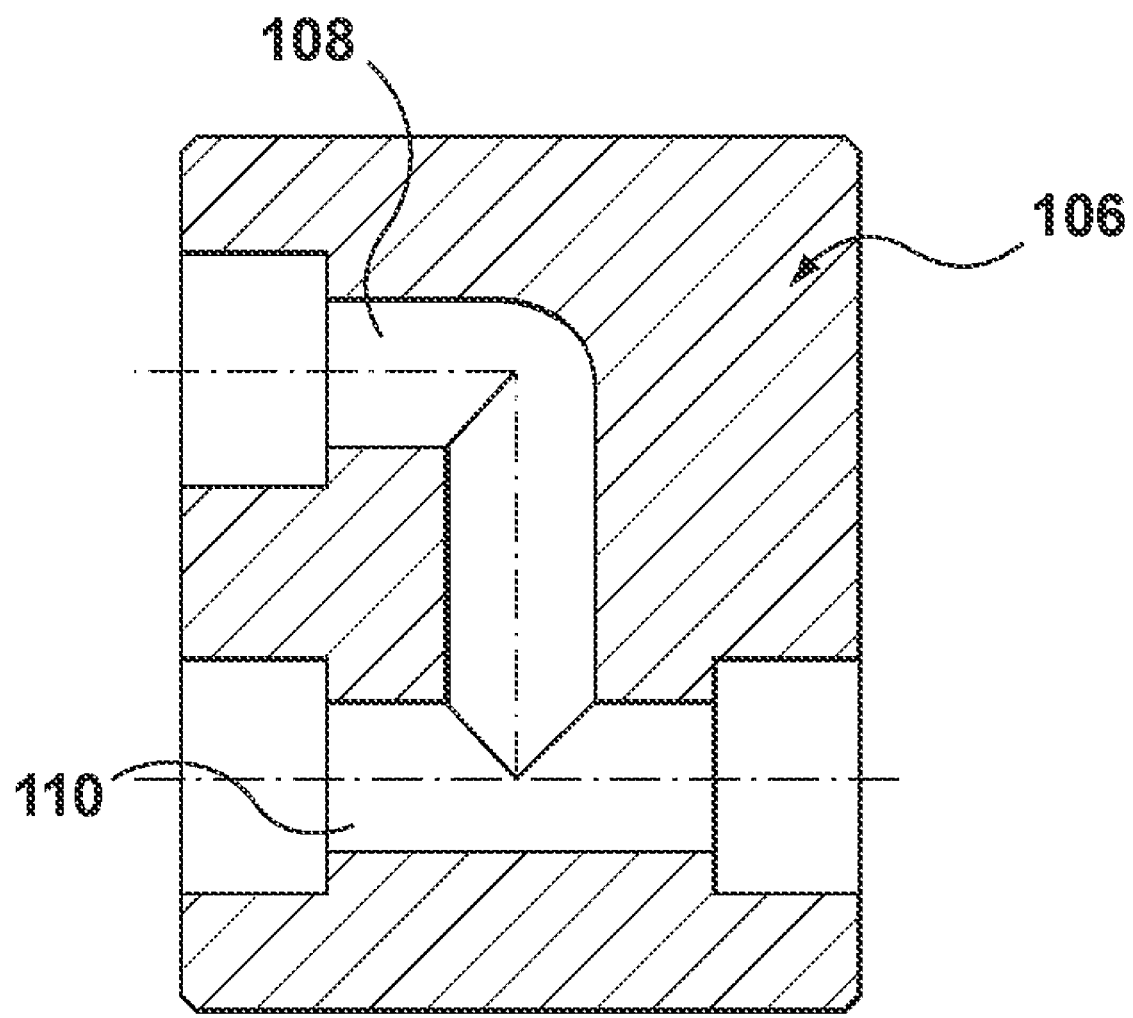
FIG. 10a is a view on 10a-10a of a central body of the 8-drop apparatus of FIG. 10.

FIG. 10 shows a manifold 24a of an eight drop injection molding apparatus. A manifold plate (not shown) is configured to receive manifold 24a, as has been described previously. Manifold 24a includes a pair of primary distribution branches 128 that extend between an inlet body 26a and a pair of central bodies 106. Central bodies 106 are similar in function to inlet body 26a with the exception that they receive melt from distribution branches 128 rather than from the machine through the sprue bushing 40. Secondary distribution branches 228 extend between each central body 106 and a respective nozzle assembly 34a. Central body 106, which is shown in FIG. 10a, includes an inlet channel 108 for receiving melt from a melt channel 156 of primary distribution branch 128 and four outlet channels 110 for delivering melt to melt channels 256 of secondary distribution branches 228. Operation of the eight drop apparatus is similar to operation of the injection molding apparatus of FIG. 1 and therefore will not be described further here.

Figure 11:
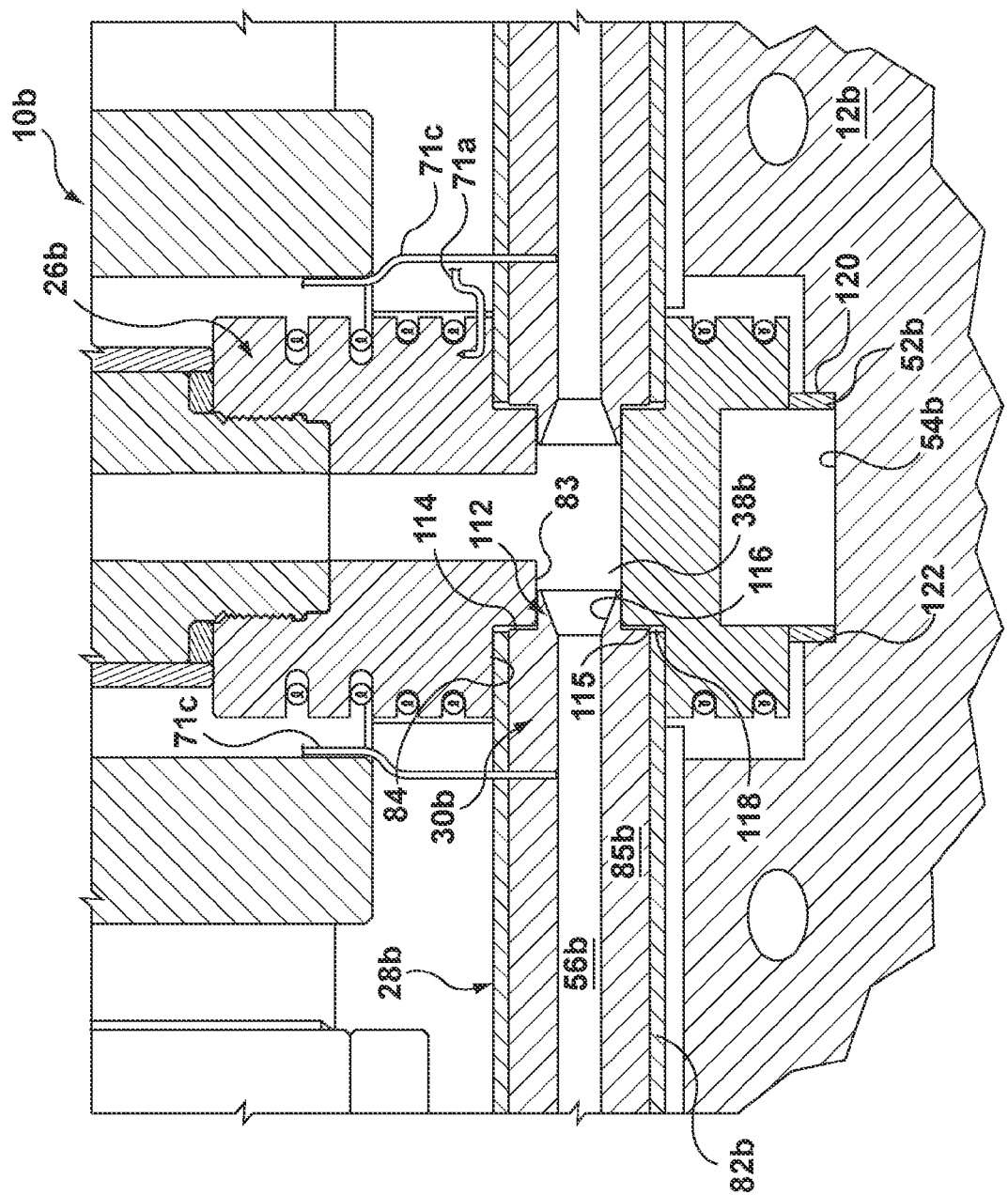
FIG. 11 is a side sectional view of an injection molding apparatus according to another embodiment of the present invention.

Referring to FIG. 11, another embodiment of an injection molding apparatus 10b is shown. Injection molding apparatus 10b is similar to injection molding apparatus 10 of FIG. 1, however, distribution branches 28b have been cut to an appropriate length from a stock size and then machined to provide a projection 112 and a shoulder 114 at first end 30b thereof. The projection 112 allows for sealing between the distribution branches 28b and inlet 26b over a larger window of heat expansion which as a result allows the injection molding apparatus 10b to be operational within a wider operating temperature window. A thermocouple 71c is inserted into tube 85b to monitor the temperature of tube 85b, however in a further embodiment the thermocouple 71c can also feedback to a controller to adjust the temperature of the tube 85b by adjusting the heater 70 in the inlet body 26b and/or the heater 72 in the nozzle assembly 34.

First end 30b of distribution branch 28b is slidably received in bore 83, which is provided in inlet body 26b, and projection 112 is received in outlet channel 38b of inlet body 26b. A tapered inner wall 116 provides a smooth transition for the melt to flow between the inlet body 26b and the distribution branch 28b. Bore 83 is sized to allow for axial thermal expansion of conductive sleeve 82b of the distribution branch 28b up to a maximum operating temperature. A seal is provided between distribution branch 28b and the inlet body 26b by the projection 112, which includes a diameter that is sized to fit within the outlet channel 38b. When the distribution branch 28b is operated at a temperature that is less than the maximum operating temperature, a gap 118 occurs between an end surface 115 of bore 83 and the shoulder 114 of the distribution branch 28b. The gap 118 generally does not collect melt during operation of the injection molding apparatus 10b as a result of the seal provided between the projection 112 and the outlet channel 38b. This seal is maintained regardless of the operating temperature because the tube 85b of distribution branch 28b and the inlet body 26b are typically made of the same material, therefore no relative thermal expansion occurs. Because the seal is provided between the projection 112 and the outlet channel 38b, the tolerance on the length of the distribution branch 28b and the tolerance on the depth of bore 84 may both be slightly relaxed.

Inlet body 26b of injection molding apparatus 10b further includes a flange 52b that is received in recess 54b of manifold plate 12b to locate the inlet body 26b with respect to the manifold plate 12b. The flange 52b is made of a material that is more insulative than the material from which inlet body 26b is made in order to provide a thermal barrier between the inlet body 26b and the manifold plate 12b. The flange 52b is coupled to the inlet body 26b by brazing or any other suitable method and the flange 52b may be made of any suitable insulative material such as, titanium or ceramic, for example.

Figure 12:
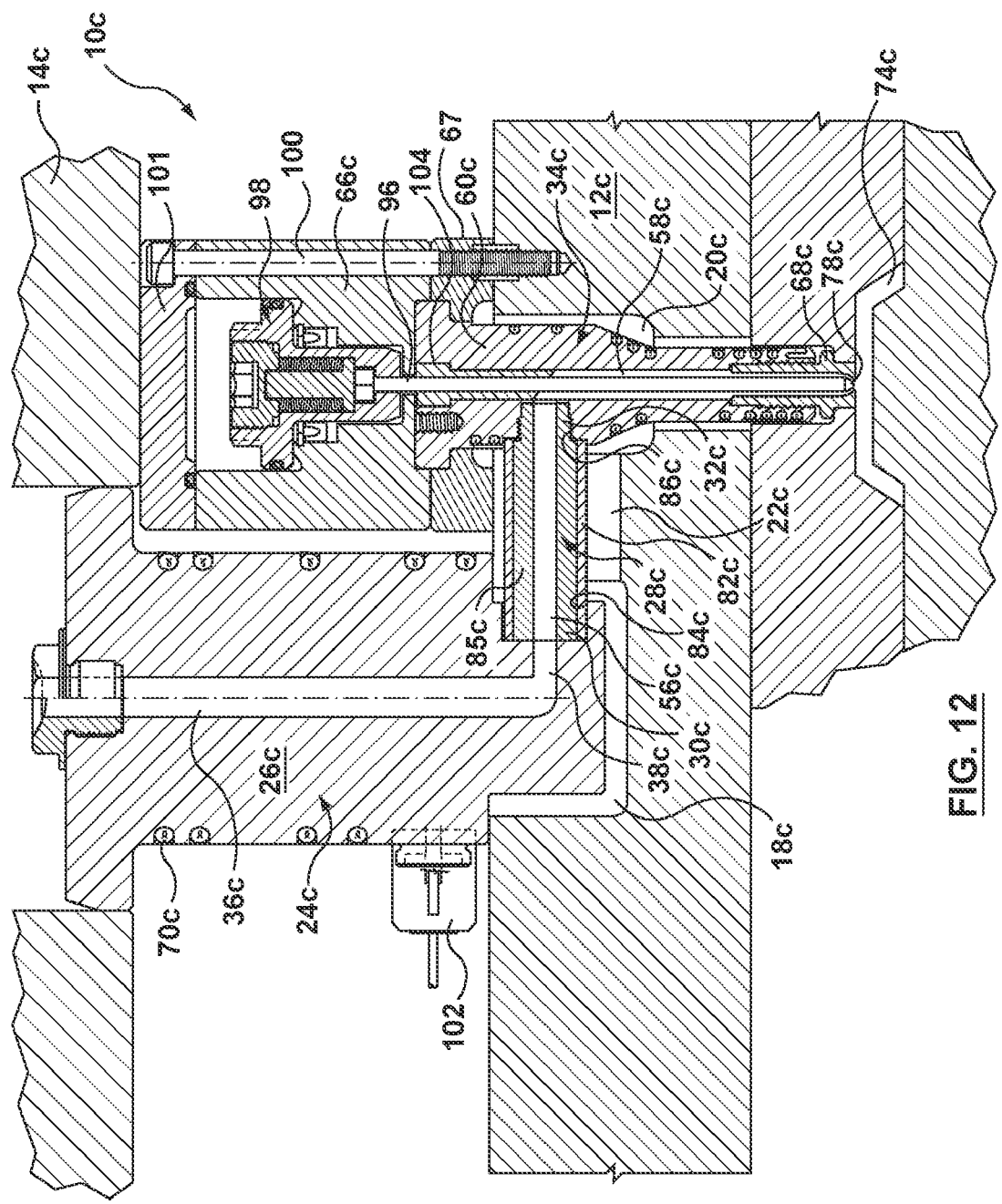
FIG. 12 is a side sectional view of an injection molding apparatus according to another embodiment of the present invention.

Referring to FIG. 12, another embodiment of an injection molding apparatus 10c including configurable manifold 24c is shown. Injection molding apparatus 10c includes a manifold plate 12c having a central bore 18c and a trough 22c for receiving an inlet body 26c and a distribution branch 28c of manifold 24c. The manifold plate 12c further includes a nozzle-receiving bore 20c for receiving a nozzle assembly 34c. Inlet body 26c includes an inlet channel 36c for receiving a melt stream from a machine nozzle (not shown) and an outlet channel 38c. A melt channel 56c of the distribution branch 28c receives melt from outlet channel 38c and delivers the melt to a nozzle channel 58c of nozzle assembly 34c. Inlet body 26c includes heater 70c, which is coupled to a power source (not shown) through a connector 102.

A valve pin 96, which is movable by an actuator 98, is slidable through nozzle channel 58c of nozzle body 60c to selectively open a mold gate 78c. A valve pin bushing 104 is provided in an upstream end of nozzle body 60c. The actuator 98 is housed in support 66c, which is sandwiched between machine platen 14c and nozzle flange 67. Nozzle flange 67 supports the nozzle body 60c and is located between the manifold plate 12c and the support 66c. The actuator 98 includes a cap 101. The support 66c is coupled to manifold plate 12c by a fastener 100 extending from cap 101, through support 66c, through nozzle flange 67, and into manifold plate 12c. The nozzle flange 67 and support 66c may be made of a material which is less thermally conductive than the nozzle body 60c material to limit thermal conduction therebetween. In addition a layer (not shown) of material more insulative than the nozzle body 60c can be provided between nozzle body 60c, nozzle flange 67, and support 66c to also limit thermal conduction therebetween.

Distribution branch 28c is generally a tube 85c that is surrounded by a conductive sleeve 82c. The distribution branch 28c does not include a heater. Similar to the embodiment of FIG. 1, heat is transferred to the distribution branch 28c through the conductive sleeve 82c from the inlet body 26c and the nozzle assembly 34c. The distribution branch 28c includes a first end 30c, which is coupled to the inlet body 26c, and a second end 32c, which is coupled to nozzle assembly 34c. First end 30c is slidably received in a bore 84c provided in inlet body 26c. The bore 84c is sized to allow for axial thermal expansion of the distribution branch 28c. Second end 32c is not surrounded by conductive sleeve 82c and is threaded. The second end 32c is received in a threaded bore 86c that is provided in nozzle body 60c of the nozzle assembly 34c. Because the second end 32c is fixed, axial thermal expansion occurs in the direction of the inlet body 26c. As such, the alignment of the nozzle assembly 34c with respect to a mold cavity 74c is unaffected by the thermal expansion. In addition, radial thermal expansion occurs at the first end 30c due to the conductive sleeve 82c, which provides a seal between the distribution branch 28c and the inlet body 26c.

It will be appreciated by a person skilled in the art that the second end 32c of the distribution branch 28c may alternatively be fixed to the nozzle body 60c by brazing or any other suitable method.

In operation, melt is injected from a machine nozzle (not shown) into inlet channel 36c of inlet body 26c through melt channel of sprue bushing (not shown). The melt then flows through outlet channels 38c of inlet body 26c into melt channels 56c of distribution branches 28c. From the distribution branches 28*c*, the melt flows into nozzle channel 58*c* of nozzle assembly 34*c*, through mold gate 78*c* and into mold cavity 74*c*. During operation, the conductive sleeve 82*c* transfers heat from the heated inlet body 26*c* and the heated nozzle assembly 34*c* to the melt passing through the distribution branch 28*c* in order to maintain the melt at a desired temperature as it passes between the inlet body 26*c* to the nozzle assembly 34*c*. Once the mold cavity 74*c* has been filled with melt, the valve pin 96 is actuated to a forward position to close off the gate 78*c* in the nozzle tip 68*c* to prevent the melt from continuing to flow into the mold cavity 74*c*, the melt in the mold cavity 74*c* is cooled and the molded parts are ejected from injection molding apparatus 10*c*.

Figure 13:
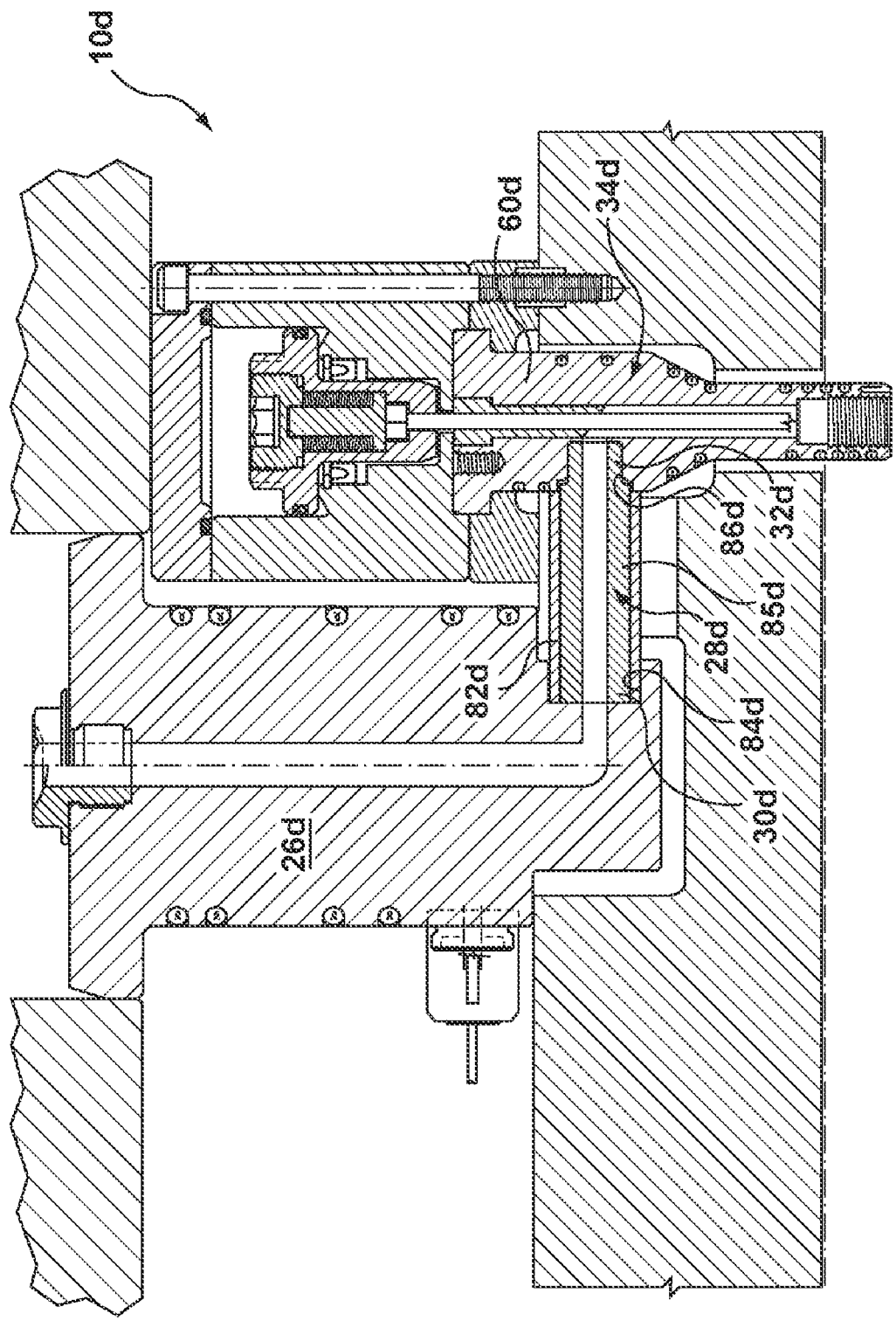
FIG. 13 is a side sectional view of an injection molding apparatus according to yet another embodiment of the present invention.

Referring to FIG. 13, an injection molding apparatus 10*d* according to another embodiment is shown. The injection molding apparatus 10*d* is similar to the embodiment of FIG. 11, however, both first end 30*d* and second end 32*d* of distribution branch 28*d* are slidable within bores 84*d* and 86*d* of inlet body 26*d* and nozzle assembly 34*d*, respectively. Distribution branch 28*d* is generally a tube 85*d* that is surrounded by a conductive sleeve 82*d* and is unheated. Heat is transferred to the distribution branch 28*d* via the conductive sleeve 82*d* from the inlet body 26*d* and the nozzle assembly 34*d*. When the injection molding apparatus 10*d* is heated to an operating temperature, the distribution branch 28*d* is free to expand axially in both directions. In addition, the distribution branch 28*d* expands radially so that first end 30*d* and second end 32*d* form a seal between the inlet body 26*d* and nozzle body 60*d*, respectively.

Figure 14:
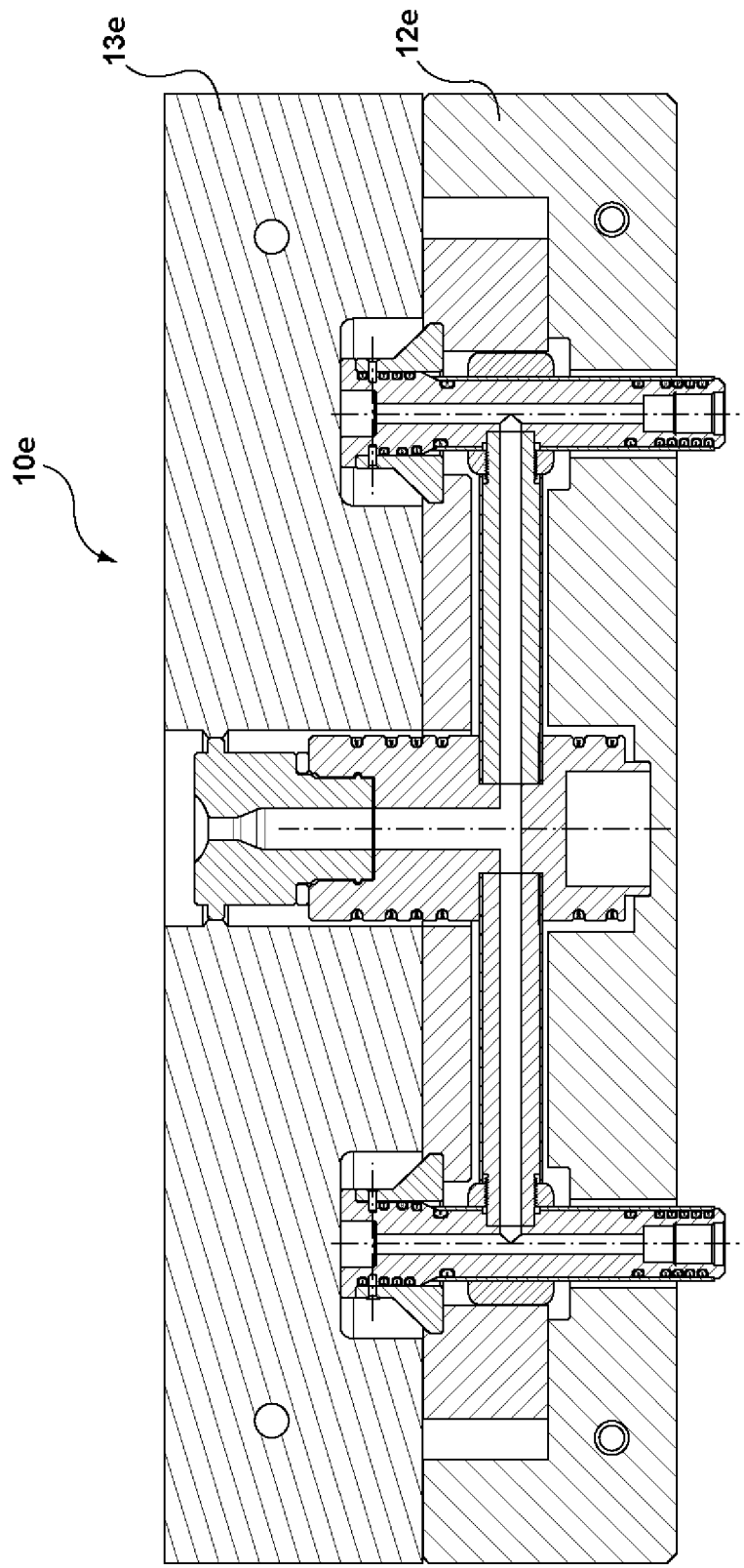
FIG. 14 is a side sectional view of an injection molding apparatus according to another embodiment of the present invention.

Referring now to FIG. 14, an injection molding apparatus 10*e* is generally shown. Injection molding apparatus 10*e* is generally similar to injection molding apparatus 10 of FIG. 1, except that it does not include pillars 16. Instead manifold plate 12*e* extends to clamp plate 13*e*. In other respects, FIG. 14 is similar to FIG. 1, therefore, all of the parts will not be described again herein.

Figure 15:
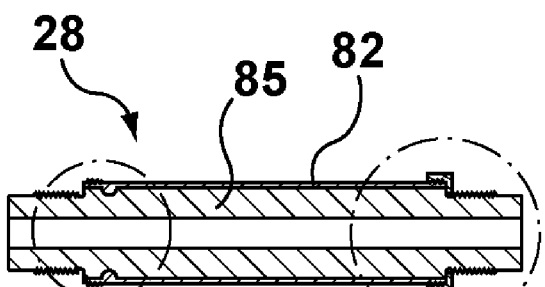
FIG. 15 is a side sectional view of a distribution branch according to an embodiment of the present invention.
Figure 15A:
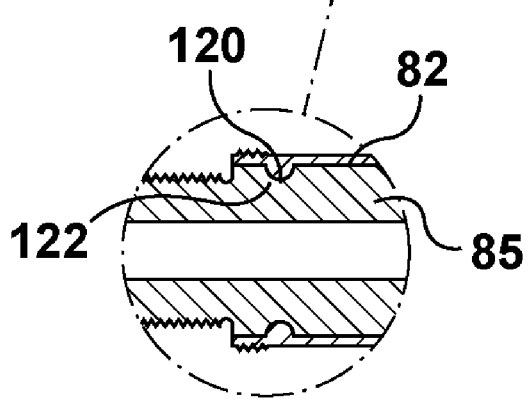
FIG. 15A is a detail view of the left side of the distribution branch according to FIG. 15 showing one alternative way to couple the conductive sleeve to the tube.
Figure 15B:
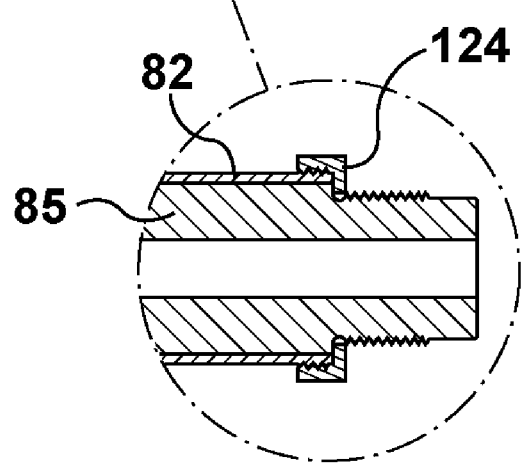
FIG. 15B is a detail view of right side of the distribution branch according to FIG. 15 showing an alternative way to couple the conductive sleeve to the tube.

Referring to FIG. 15, an exemplary distribution branch 28 is shown with alternative means to couple conductive sleeve 82 to tube 85. FIG. 15A shows a snapfit arrangement, wherein a protrusion 110 in sleeve 82 is pressed into a depression 112 in tube 85. FIG. 15B shows an arrangement wherein a threaded cap 114 is coupled to sleeve 82.

Figure 16:
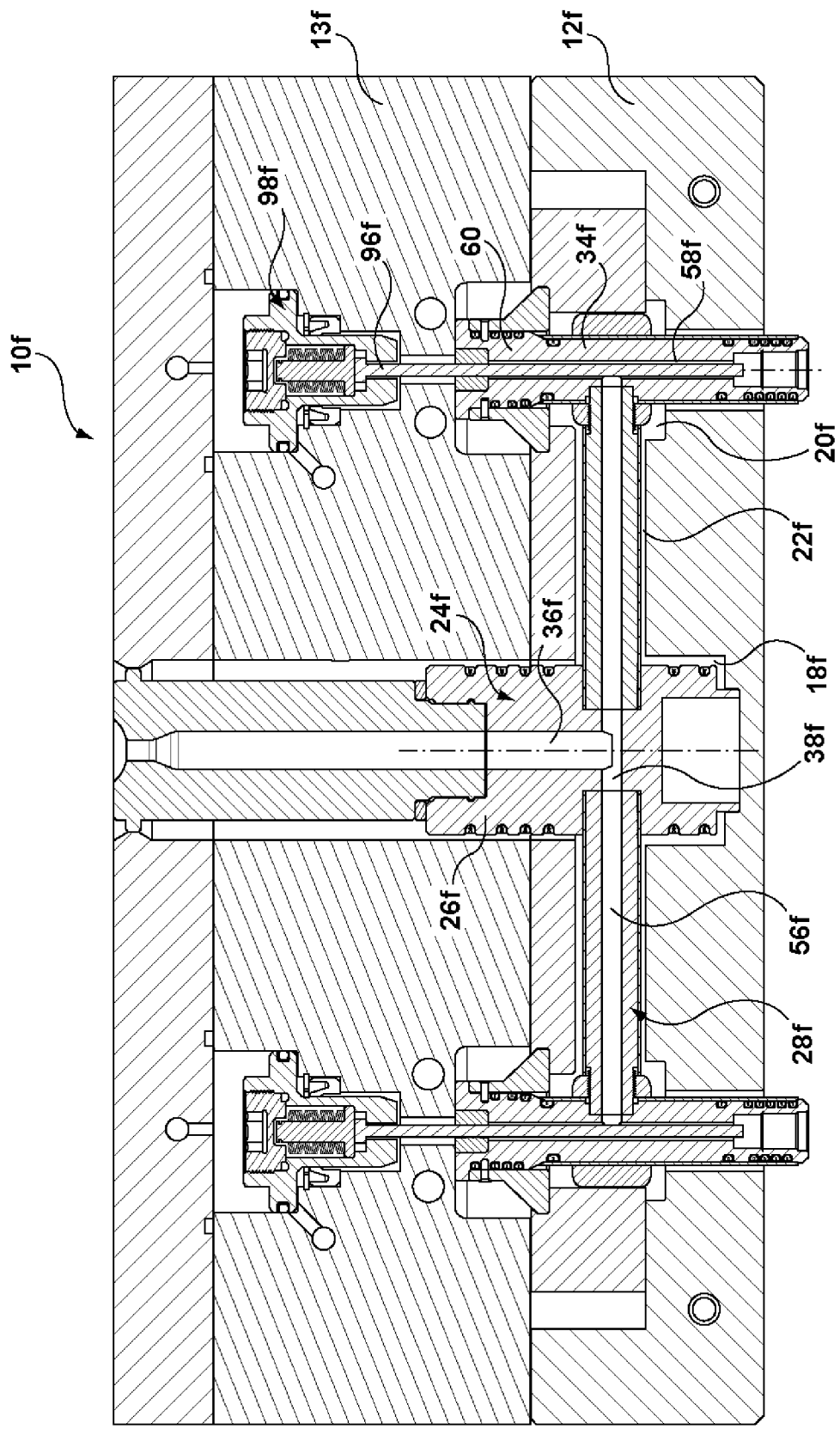
FIG. 16 is a side sectional view of an injection molding apparatus according to another embodiment of the present invention.

Referring to FIG. 16, an alternative embodiment of an injection molding apparatus 10*f* including configurable manifold 24*f* is shown. Injection molding apparatus 10*f* includes a manifold plate 12*f* having a central bore 18*f* and a trough 22*f* for receiving an inlet body 26*f* and a distribution branch 28*f* of manifold 24*f*. The manifold plate 12*f* further includes a nozzle-receiving bores 20*f* for receiving nozzle assemblies 34*f*. Inlet body 26*f* includes an inlet channel 36*f* for receiving a melt stream from a machine nozzle (not shown), and outlet channels 38*f*. A melt channel 56*f* of each distribution branch 28*f* receives melt from a respective outlet channel 38*f* and delivers the melt to a nozzle channel 58*f* of nozzle assembly 34*f*. As in FIG. 14, manifold plate 12*f* abuts clamp plate 13*f* such that the pillars described with respect to FIG. 1 are not used. FIG. 16 illustrates a more conventional valve pin arrangement, with valve pin 96*f* movable by an actuator 98*f*. Actuator 98*f* is separate from nozzle body 60*f*. Other features of actuator 98*f* are generally conventional and are known to those of ordinary skill in the art.

FIGS. 17, 17A, 18, and 18A show alternative arrangements for coupling distribution branch 28 to nozzle assembly 34. FIGS. 17, 17A, 18, and 18A are shown in the heated configuration as conductive sleeve 82 abuts against inlet body 26 on one end and clamp 90 at another end. FIGS. 17 and 17A show first end 30 and second end 32 fixedly coupled to inlet body 26 and nozzle assembly 34, respectively. First end 30 is threaded and is coupled to threaded recess 84 of inlet body 26. Second end 32 includes a threaded portion 88 and is coupled to threaded bore 92 of clamp 90. FIGS. 18 and 18A show distribution branch 28 slidably coupled at first end 30 and second end 32 to inlet body 26 and nozzle assembly 34, respectively. In particular, first end 30 is received in recess 84 of inlet body 26. In the heated condition shown in FIGS. 18 and 18A, first end 30 about against a wall of recess 84. Similarly, second end 32 is slidably received in a bore 92 of clamp 90 and a recess of nozzle body 60.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a melt channel for receiving a melt stream of moldable material from a source;
   a nozzle coupled to the melt channel of the manifold, the nozzle having a nozzle channel for receiving the melt stream from the melt channel of the manifold, the nozzle having a heater;
   a mold cavity in communication with the nozzle channel, the mold cavity for receiving the melt stream from the nozzle channel through a mold gate; and
   a temperature sensor at the manifold for use in adjusting the heater of the nozzle.

2. The injection molding apparatus of claim 1, wherein the temperature sensor monitors a temperature of the manifold.

3. The injection molding apparatus of claim 1, wherein the temperature sensor feeds back to a controller that adjusts a temperature of the manifold by adjusting the heater of the nozzle.

4. The injection molding apparatus of claim 1, wherein the temperature sensor is a thermocouple.

5. The injection molding apparatus of claim 1, wherein the nozzle includes another temperature sensor.

6. The injection molding apparatus of claim 1, wherein the manifold includes an inlet body.

7. The injection molding apparatus of claim 6, wherein the inlet body includes a heater, the temperature sensor further being used for adjusting the heater of the inlet body.

8. The injection molding apparatus of claim 6, wherein the inlet body includes a second temperature sensor.

9. The injection molding apparatus of claim 1, wherein the manifold includes a distribution branch.

10. The injection molding apparatus of claim 9, wherein the temperature sensor is inserted into the distribution branch.

11. The injection molding apparatus of claim 9, wherein the distribution branch does not include a heater.

12. The injection molding apparatus of claim 9, wherein the distribution branch comprises a tube.

13. The injection molding apparatus of claim 9, wherein a coating, film, or sleeve is applied to the distribution branch, the coating, film, or sleeve being made of a first material that is more thermally conductive than a second material on which the coating, film, or sleeve is applied.

* * * * *

UNITED STATES PATENT AND TRADEMARK OFFICE
CERTIFICATE OF CORRECTION

PATENT NO.       : 7,802,983 B2
APPLICATION NO.  : 12/326478
DATED            : September 28, 2010
INVENTOR(S)      : Jonathon Fischer and Rhonda Goslinski It is certified that error appears in the above-identified patent and that said Letters Patent is hereby corrected as shown below:

On the Title Page, Item (56), under U.S. PATENT DOCUMENTS, the date "7/1982" adjacent 3,677,682 A should read --7/1972--.

On Page 2, Item (56) under FOREIGN PATENT DOCUMENTS, add --JP  51-103151  9/1976--.

On Page 2, Item (56) under OTHER PUBLICATIONS, delete "Ewikon Brochure–ecomodul, Nov. 1, 2005".

Signed and Sealed this
Thirty-first Day of May, 2011

David J. Kappos
*Director of the United States Patent and Trademark Office*